2 Sheets—Sheet 1.

J. GLENN.
Vehicle-Springs.

No. 206,557. Patented July 30, 1878.

Witnesses:
R. C. Winshield
J. K. Smith

Inventor:
John Glenn
by Bakewell & Kerr
Attys

J. GLENN.
Vehicle-Springs.
No. 206,557. Patented July 30, 1878.
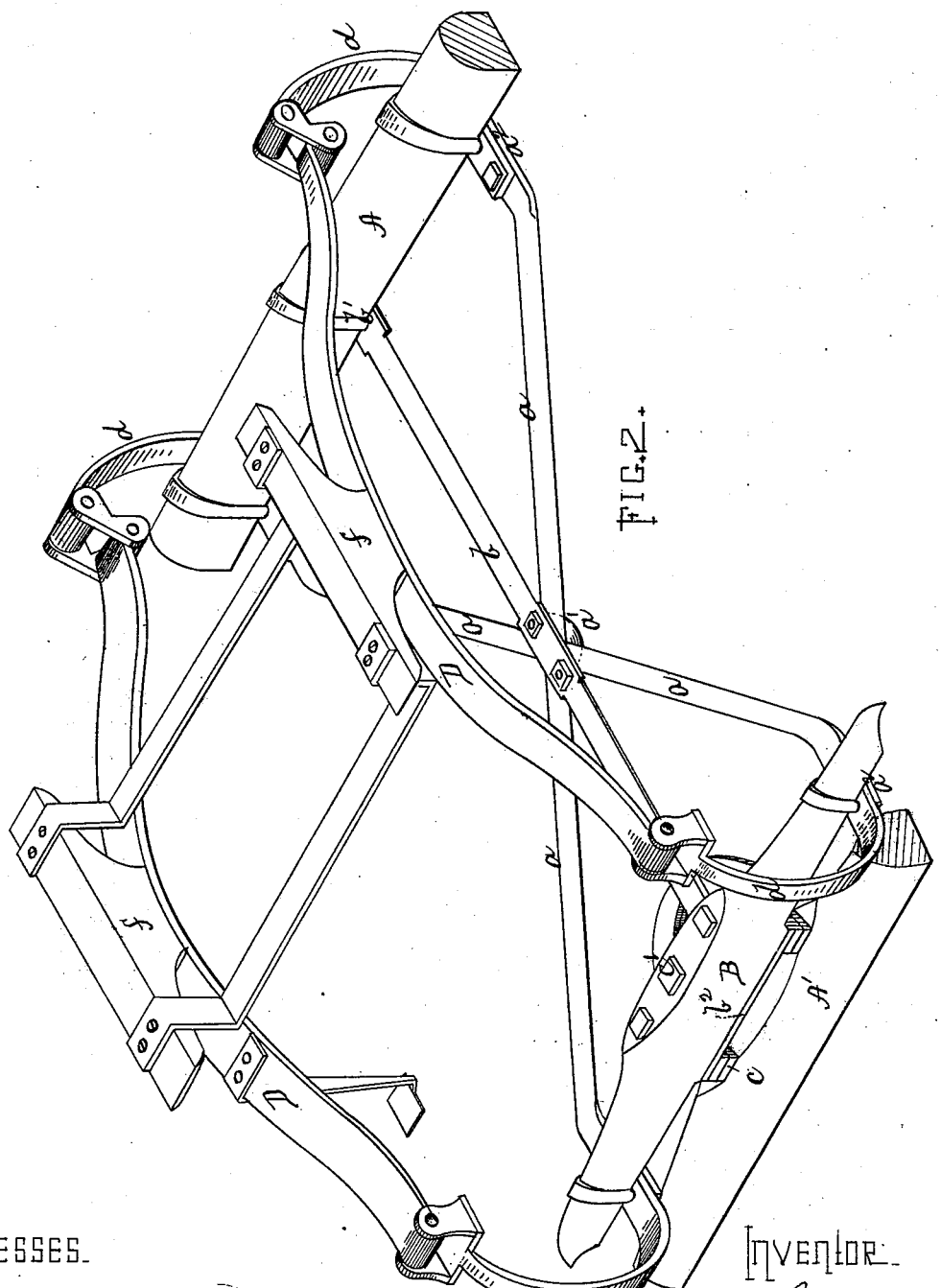

UNITED STATES PATENT OFFICE.

JOHN GLENN, OF PARNASSUS, PENNSYLVANIA.

IMPROVEMENT IN VEHICLE-SPRINGS.

Specification forming part of Letters Patent No. 206,557, dated July 30, 1878; application filed June 8, 1878.

*To all whom it may concern:*

Be it known that I, JOHN GLENN, of Parnassus, in the county of Westmoreland and State of Pennsylvania, have invented a new and useful Improvement in Vehicle Springs and Couplings; and I do hereby declare the following to be a full, clear, and exact description thereof, reference being had to the accompanying drawing, forming part of this specification, in which—

Figure 1:
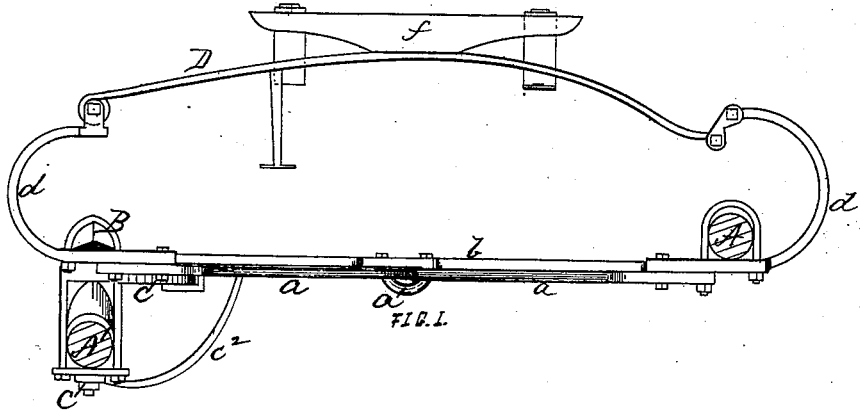
Figure 3:
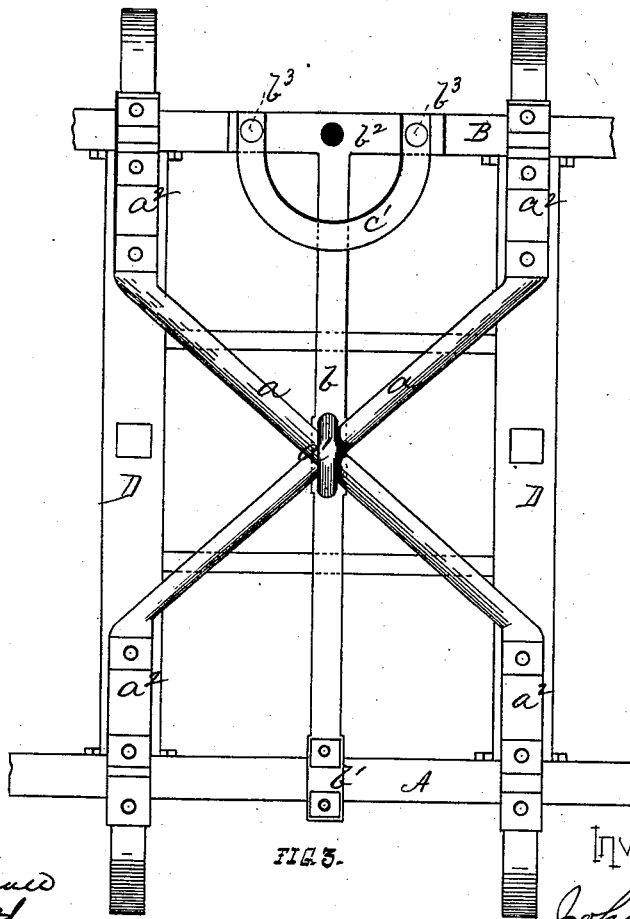

Figure 1 is a side elevation of devices embodying my invention. Fig. 2 is a perspective view of the same. Fig. 3 is a bottom view, the front axle and lower plate of the fifth-wheel having been removed.

Like letters refer to like parts wherever they occur.

My invention relates to the construction and attachment of the springs and running-gear of vehicles; and consists, first, in combining, with the axle and head-block, rigid spring-hangers and semi-elliptic springs, the springs being pivoted on the front hangers and linked to the rear hangers, whereby any surging of the bed is counteracted, and an easy-riding and durable spring-support for the bed is obtained; secondly, in coupling the hind axle and head-block by a longitudinal rod or perch and diagonal cross-braces, whereby lateral play of the hind axle is avoided, an easier-running or lighter-draft vehicle is obtained, and the coupling can be made very light while its strength is preserved; and, finally, in details of construction, hereinafter more specifically set forth.

In light vehicles as usually constructed more or less inconvenience is experienced from the surging of the bed or body on the springs when the motion of the vehicle is suddenly arrested, either from stopping or the wheels striking an obstruction; and, in addition to the unpleasant jar experienced by the occupant, there is a racking or straining of the gear. Moreover, as vehicle-couplings are ordinarily constructed, they are necessarily made strong and bulky to prevent the twisting or lateral movement of the hind axle, which would add to the racking or wearing of the running-gear, and also cause the vehicle to pull heavier and get out of track.

The object of the present invention is to provide light, graceful, durable, and less expensive running-gear for vehicles, and such as will overcome the objections specified.

I will now proceed to describe my invention, so that others skilled in the art to which it appertains may apply the same.

In the drawing, A represents the hind axle; A', the front axle, and B the head-block. The hind axle, A, and head-block B are coupled by a central rod or light reach, $b$, clipped, as at $b^1$, to the rear axle, and connected to the head-block, in conjunction with the upper plate of the fifth-wheel, by means of bolts $b^3$, passed through a T-plate, $b^2$, or cross-piece, which serves to brace the head-block B against any side strain or twist, and also to support the upper plate of the fifth-wheel. To complete the coupling of head-block and hind axle, two diagonal cross-braces, $a\ a$, are used, said cross-pieces clipped at their center or where they cross, as at $a^1$, to the perch-rod $b$, and bolted at their extremities to extensions of the spring-hangers, as at $a^2$. Such a construction of the coupling not only prevents lateral play of the hind axle, but also of the head-block, rendering lightness of the parts compatible with strength therein.

$c$ indicates the lower plate of the fifth-wheel, and $c^1$ the king-bolt, secured to the front axle, while a brace, $c^2$, or any other approved form of brace, may be employed.

To the hind axle, A, and head-block B are clipped rigid spring-hangers $d$, extended at one (or the lower) end to connect with the diagonal cross-braces $a$, and at the other end adapted to pivot either the end of a half-elliptic spring, D, or a link-connection thereof. In order to carry the weight of the bed or body well over the center of the axle, and thus relieve the gearing of any strain incident to the tendency of the axle or head-block to rock, said spring-hangers are preferably bolted to the under side of both axle and head-block, as shown, and serve also as clip-plates, thus reducing the number of parts, and the liability of the parts to work loose and rattle.

D D are half-elliptic springs, the front ends of which are pivoted on the hangers $d$ of the head-block by bolts passing through ears thereon, or in other suitable manner, and the rear ends are connected to the rigid hangers $d$ of the rear axle by links pivoted on both springs and hangers. By this method the forward surging of the springs and body is restrained, while any or all end thrust of the springs is accommodated by the links at the rear, and the weight is carried fairly over the axles.

The springs D may be of a single or several leaves, and the body may be hung below the spring-bars $f$, as shown or in any suitable manner.

Having thus set forth the nature and advantages of my invention, what I claim, and desire to secure by Letters Patent, is—

1. The combination, in a vehicle, of the rigid spring-hangers and the half-elliptic side springs, said springs pivoted on the hangers of the head-block, and suspended from the hangers of the rear axle by a link or links, substantially as and for the purpose specified.

2. The coupling for vehicles composed of the center rod or perch and the diagonal cross-braces, clipped or otherwise connected to the center rod at the point of crossing, substantially as and for the purpose specified.

3. In a vehicle, the combination of the diagonal cross-braces, the rigid spring-hangers, with extensions for attachment of the cross-braces, and the semi-elliptic side springs, substantially as and for the purpose specified.

In testimony whereof I, the said JOHN GLENN, have hereunto set my hand.

JOHN GLENN.

Witnesses:
   F. W. RITTER, Jr.,
   R. H. WHITTLESEY.